United States Patent
Waris (10) Patent No.: US 8,255,908 B2
(45) Date of Patent: Aug. 28, 2012

(54) MANAGING TASKS IN A DISTRIBUTED SYSTEM

(75) Inventor: Heikki Pekka Waris, Helsinki (FI)

(73) Assignee: Nokia Corporation, Espoo (FI)

( * ) Notice: Subject to any disclaimer, the term of this patent is extended or adjusted under 35 U.S.C. 154(b) by 1072 days.

(21) Appl. No.: 11/960,206

(22) Filed: Dec. 19, 2007

(65) Prior Publication Data

US 2009/0164995 A1    Jun. 25, 2009

(51) Int. Cl.
*G06F 9/46* (2006.01)

(52) U.S. Cl. .......................................... 718/100; 709/201

(58) Field of Classification Search .................. None
See application file for complete search history.

(56) References Cited

U.S. PATENT DOCUMENTS

| | | | |
|---|---|---|---|
| 6,938,255 B1* | 8/2005 | Willems et al. | 718/104 |
| 2002/0091752 A1* | 7/2002 | Firlie | 709/201 |
| 2002/0178297 A1* | 11/2002 | Lister et al. | 709/310 |
| 2006/0290776 A1 | 12/2006 | Rutten et al. | |
| 2007/0061804 A1 | 3/2007 | Anzelde et al. | |
| 2009/0320034 A1* | 12/2009 | Tsunoda et al. | 718/103 |

OTHER PUBLICATIONS

Tyugu, et al.; NUTS: a Distributed Object-Oriented Platform with High-Level Communication Functions; Computers and Artificial Intelligence, v. 17, No. 4; 1998, 305-335.

Agarwal, et al.; A Robust Framework for Distributed Processing of GIFTS Hyperspectral Data; 23rd Conference on IIPS; Session 5A, Satellite IIPS and Applications; Jan. 17, 2007.

Agarwal, et al.; A Robust Framework for Distributed Processing of GIFTS Hyperspectral Data.

Ferrari, et al.; TPVM: Distributed Concurrent Computing with Lightweight Processes; Institute of Electrical and Electronics Engineers, Inc.; 1995; pp. 211-218.

* cited by examiner

*Primary Examiner* — Emerson Puente
*Assistant Examiner* — Dong Kim
(74) *Attorney, Agent, or Firm* — Alston & Bird LLP (57) ABSTRACT

Apparatuses, systems, methods, and computer program products for facilitating the management of tasks in a distributed system with modular service architecture and distributed control functions are provided. The system includes an Application Manager, an Application Node, a Service Manager, and a number of Service Nodes that are capable of executing certain services. Upon receiving a task request from the Application Manager, the Application Node generates a task identifier associated with the particular task. The Application Node may then communicate with the Service Manager using the task identifier to receive a designation of a Service Node capable of executing the service required to complete the requested task. The Application Node can then communicate the service to the designated Service Node, including the task identifier. Once completed services are received from the various Service Nodes involved, they are assembled into a completed task using the common task identifier.

30 Claims, 5 Drawing Sheets

MANAGING TASKS IN A DISTRIBUTED SYSTEM

TECHNOLOGICAL FIELD

Embodiments of the present invention relate generally to distributed systems and, more particularly, to distributed systems with modular service architecture based on mutually independent service nodes.

BACKGROUND

Distributed computing is a type of parallel or segmented computing in which a processing task is distributed among multiple processors in an effort to complete the task more quickly and efficiently. For example, a computer program may be split up into multiple parts, each part distributed to a different computer or processor for simultaneous execution, and the executed parts recombined to provide the complete, executed program. In this way, the program may be executed in a fraction of the time it would have taken had the entire program been executed by a single processor.

Distributed systems generally rely on some central control for task management or prior knowledge of service composition (i.e., which processor is capable of executing which part of the task). In an architecture in which the control of tasks is more distributed, it is more difficult to identify the different parts the make up the completed task because there may be several independent processors involved that are not aware of the complete task to which they are contributing.

Thus, there is a need for a way to manage a task in a distributed system with modular service architecture in which control functions are distributed as well.

BRIEF SUMMARY

An apparatus, method, and computer program product are therefore provided for managing tasks in a distributed system. An application node generates a task identifier that is associated with a particular task request. The application node may then communicate with other components of the distributed system using the task identifier to request services and may identify completed services for assembly into a completed task based on the task identifier.

In one exemplary embodiment, an apparatus for managing tasks is provided. The apparatus comprises a processor configured to receive a task request and generate a task identifier that is associated with the requested task. The processor may then communicate a Service Access Request including the task identifier to a service manager, wherein the Service Access Request describes a service required to complete the requested task, and receive a designation of a service node configured to execute the service of the Service Access Request. The processor may further communicate the service including the task identifier to the designated service node, receive a completed service from the service node, and assemble the completed service with other completed services that include the same task identifier into a completed task.

In some cases, the processor may be configured to generate a task identifier that is pseudorandom and has a predetermined lifetime. After the expiration of the predetermined lifetime, the service manager may be configured to delete the task identifier. Furthermore, the processor may be configured to communicate to the service manager a Service Update Request including the task identifier and a designation of any service node that has not completed a respective service before an expiration of the predetermined lifetime. The Service Update Request may instruct the service manager to maintain the task identifier in this case.

The processor may be configured to generate a task identifier that includes an authorization portion that allows the service manager to verify that a communication including the task identifier is genuine. Also, the processor may be configured to communicate a Service Completed Request to the service manager including the task identifier when the requested task is complete. The service manager may, in turn, be configured to delete the task identifier upon receiving the Service Completed Request. In some cases, the processor may be configured to communicate the task identifier to an application manager.

In other exemplary embodiments, a method and a computer program product for managing tasks are provided. The method and computer program product receive a task request and generate a task identifier that is associated with the requested task. A Service Access Request including the task identifier may then be communicated to a service manager, wherein the Service Access Request describes a service required to complete the requested task, and a designation of a service node configured to execute the service of the Service Access Request may then be received. The service including the task identifier may be communicated to the designated service node and a completed service received from the service node, and the completed service may be assembled with other completed services that include the same task identifier into a completed task.

In some cases, a pseudorandom task identifier having a predetermined lifetime may be generated, wherein after an expiration of the predetermined lifetime the service manager may be configured to delete the task identifier. Furthermore, Service Update Request including the task identifier and a designation of any service node that has not completed a respective service before the expiration of the predetermined lifetime may be communicated to a service manager, wherein the Service Update Request instructs the service manager to maintain the task identifier.

In some cases, a task identifier may be generated that includes an authorization portion that allows the service manager to verify that a communication including the task identifier is genuine. In addition, a Service Completed Request including the task identifier may be communicated to the service manager when the requested task is complete, wherein the service manager is configured to delete the task identifier upon receiving the Service Completed Request. In some cases, the task identifier may be communicated to an application manager.

In another exemplary embodiment, an apparatus for managing tasks is provided that includes means for receiving a task request and means for generating a task identifier that is associated with the requested task. The apparatus may further include means for communicating a Service Access Request including the task identifier to a service manager, wherein the Service Access Request describes a service required to complete the requested task, as well as for receiving a designation of a service node configured to execute the service of the Service Access Request. In addition, the apparatus may include means for communicating the service including the task identifier to the designated service node and for receiving a completed service from the service node, and means for assembling the completed service with other completed services that include the same task identifier into a completed task. In some embodiments, the apparatus includes means for communicating to the service manager a Service Update Request including the task identifier and a designation of any service node that has not completed a respective service before an expiration of the predetermined lifetime, where the Service Update Request instructs the service manager to maintain the task identifier.

In another exemplary embodiment, system for managing tasks is provided that includes a plurality of service nodes each configured to execute a service component and a service manager configured to communicate with the service nodes and to maintain a register of the service nodes including a service identifier associated with a respective service node and identifying the service for which the respective service node is configured to execute. The system also includes an application node configured to communicate with the service manager and the service nodes and an application manager configured to establish a control connection with the application node and at least one of the service nodes.

The application manager may be configured to communicate a task request to the application node. The application node may be configured to generate a task identifier that is associated with the requested task and to communicate a Service Access Request including the task identifier to the service manager, wherein the Service Access Request describes a service required to complete the requested task. Furthermore, the service manager may be configured to associate the task identifier with a service identifier based on the service described by the Service Access Request and with a designated service node configured to execute the service, and the service manager may be configured to communicate the task identifier, service identifier, and the designated service node to the application node. The application node may be configured to communicate the service including the task identifier to the designated service node and to receive a completed service including the task identifier from the designated service node. The application node may also be configured to assemble the completed service with other completed services that include the same task identifier into a completed task and to communicate the completed task to the application manager.

In some cases, at least one service node may be configured to communicate a sub-service including the task identifier to another service node, wherein the other service node may be configured to execute the sub-service, and wherein the sub-service is required to complete the service communicated by the application node. Also, the application node may be configured to generate a task identifier that is pseudorandom and has a predetermined lifetime. After an expiration of the predetermined lifetime the service manager may be configured to delete the task identifier.

The application node may also be configured to communicate to the service manager a Service Update Request including the task identifier and a designation of any service node that has not completed a respective service before the expiration of the predetermined lifetime. The Service Update Request may in turn instruct the service manager to maintain the task identifier. Furthermore, the application node may be configured to communicate the task identifier to the application manager, and the application manager may be configured to control the behavior of the application node and any service node involved in the requested task by sending via the control connection a Policy Action Request to the respective application node and service nodes.

In some cases, the service node may be configured to delete a task identifier that is no longer served by the service node and to mark as inactive a task identifier that does not require processing. Also, the application node may be configured to generate a task identifier that includes an authorization portion that allows the service manager to verify that a communication including the task identifier is genuine. The application node may be configured to communicate a Service Completed Request to the service manager including the task identifier when the requested task is complete, and the service manager may be configured to delete the task identifier upon receiving the Service Completed Request. In addition, the application node may be configured to communicate the task identifier to the application manager. Furthermore, the service manager may be configured to trace a chain of service identifiers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
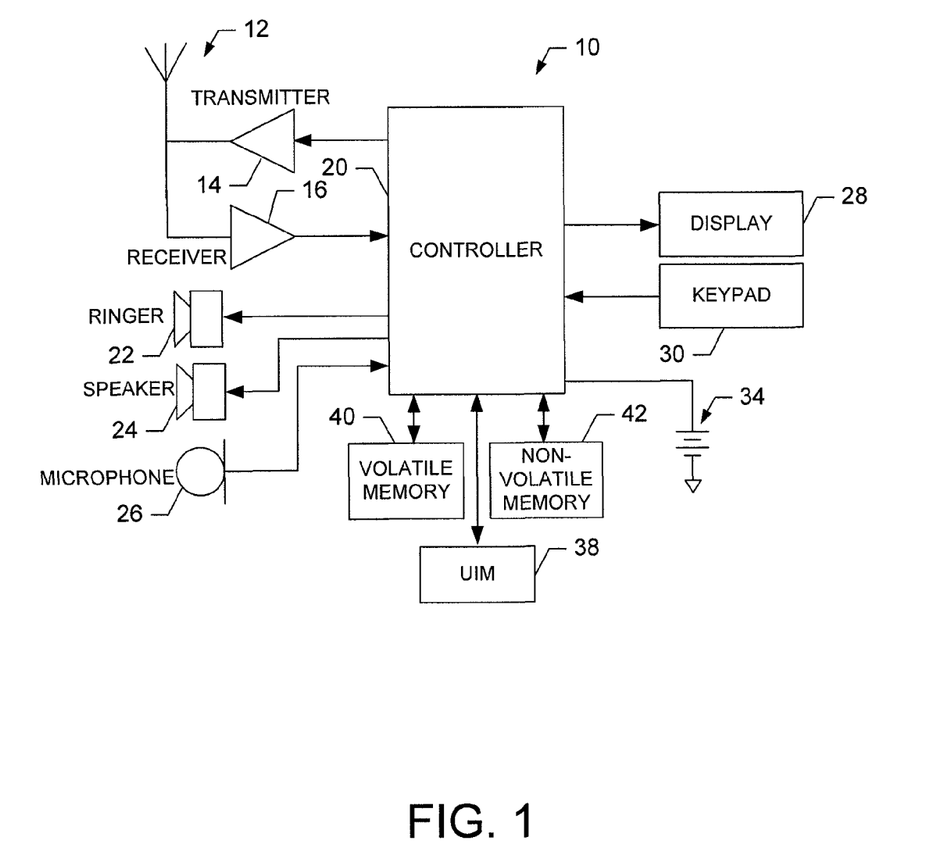
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, internet devices, mobile televisions, MP3 or other music players, cameras, laptop computers and other types of voice and text communications systems, can readily employ the present invention.

In addition, while several embodiments of the present invention will benefit a mobile terminal 10 as described below, embodiments of the present invention may also benefit and be practiced by other types of devices, i.e., fixed terminals. Moreover, embodiments of the present invention will be primarily described in conjunction with mobile communications applications. It should be understood, however, that embodiments of the present invention can be utilized in conjunction with a variety of other applications, both in the mobile communications industries and outside of the mobile communications industries. Accordingly, embodiments of the present invention should not be construed as being limited to applications in the mobile communications industry.

In one embodiment, however, the apparatus for facilitating management of a task is a mobile terminal 10. Although the mobile terminal may be embodied in different manners, the mobile terminal 10 of one embodiment includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), third-generation wireless communication protocol Wideband Code Division Multiple Access (WCDMA), or future protocols.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 of this embodiment also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
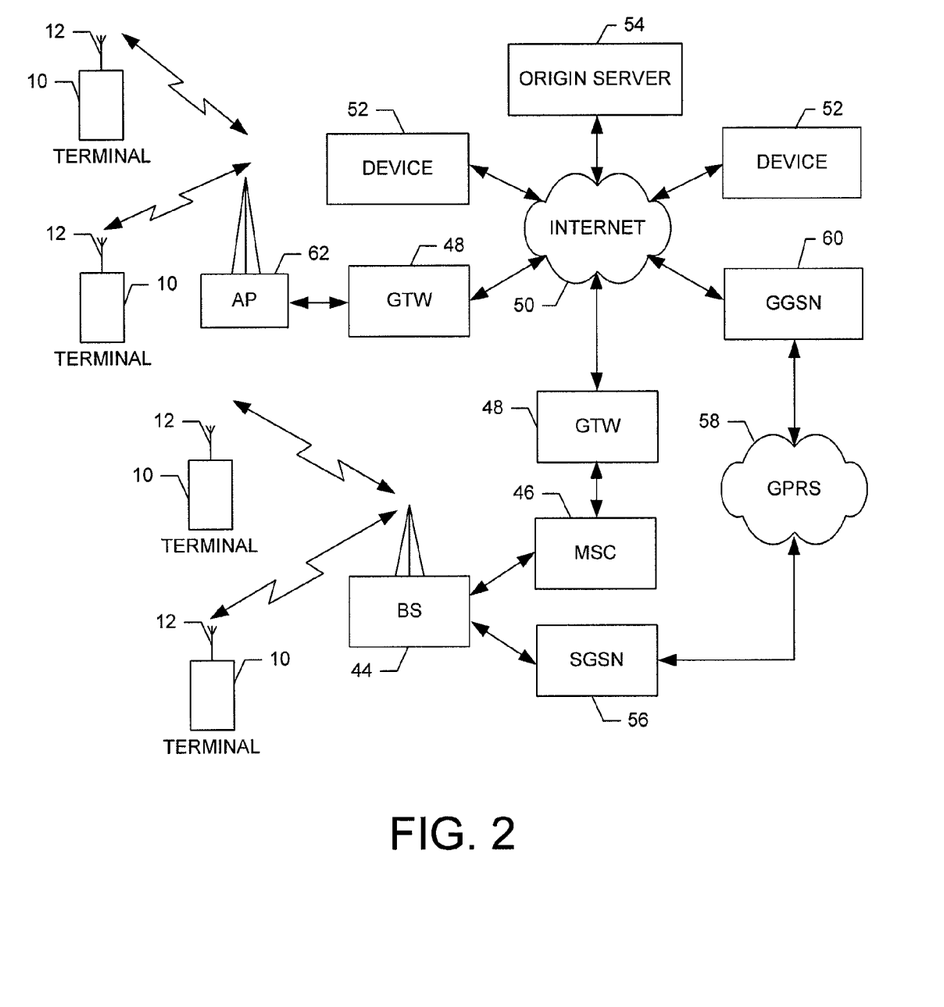
FIG. 2 is a schematic block diagram of a wireless communications system according to an exemplary embodiment of the present invention.

Referring now to FIG. 2, an illustration of one type of system that would benefit from and otherwise support embodiments of the present invention is provided. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a device 52 (two shown in FIG. 2), origin server 54 (one shown in FIG. 2), or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a device 52 and/or origin server 54 may be coupled to the mobile terminal 10 via the Internet 50, SGSN 56 and GGSN 60. In this regard, devices such as the device 52 and/or origin server 54 may communicate with the mobile terminal 10 across the SGSN 56, GPRS core network 58 and the GGSN 60. By directly or indirectly connecting mobile terminals 10 and the other devices (e.g., device 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the device 52, the origin server 54, and/or any of a number of other devices, to the Internet 50, the mobile terminals 10 can communicate with one another, the device, etc., to thereby carry out various functions of the mobile terminals 10, such as to transmit data, content or the like to, and/or receive content, data or the like from, the device 52. As used herein, the terms "data," "content," "information," "signals" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to devices 52 across the Internet 50, the mobile terminal 10 and device 52 may be coupled to one another and communicate in accordance with, for example, RF, BT, IrDA or any of a number of different wireline or wireless communication techniques, including LAN, WLAN, WiMAX and/or UWB techniques. One or more of the devices 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the devices 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, which shows a distributed system 100 in which process control and service management are distributed. The system 100 may include, for example, an Application Manager 105 responsible for process control and a Service Manager 110 responsible for service management. In this regard, process control refers to the functions associated with processes, i.e., combinations of functionality that perform a particular use case or are used by an application that initiates an activity requesting a set of functionalities. The processes represent a set of states in the system where the states and their transitions may not be known to the particular functionality but may be known to a designer or to the application. In a system where the functionality is provided by services without being assigned by a central controlling authority, the processes are identified when they are initiated by an application and need to be controlled thereafter by separate means, as described below.

Service management refers to the functions associated with services, i.e., parts of overall functionality made available to and accessed in such a way that each service may be used by various applications and is not designed for use by any single application. Thus, service consumers only need to know the service interface and not the internals of the service because the associations between service functionalities are exposed over that interface instead of being embedded within each service Because embodiments of the present invention apply to a distributed system where the functionality is provided by separate and typically loosely-coupled entities, the overall functionality of a process needs to be created out of services, which need to be managed to ensure optimal operation when other coexisting processes are taken into account.

For example, the Application Manager 105 may be configured to receive inputs from a user requesting a certain process to be executed, such as playing music using a music player application. In this case, the music player application may select a song according to the user's preferences, access the music from its storage, perform necessary decoding, output the resulting audio stream in an audio device, and display graphical elements related to the application while allowing the user to control the playing process. In order to satisfy the user's request (i.e., playing music in the previous example), the Application Manager 105 may initiate a task request (depicted as "Task (r)" in FIG. 3) that is communicated to an Application Node 120. The Application Node 120 may in turn break down the requested task into two or more service requests ("s(r)") and distribute these service requests to other components for completion, as described below. The Application Manager 105 may be configured to have the ability to control how the service requests are distributed and carried out.

The Service Manager 110, on the other hand, may have different responsibilities in the system 100. The Service Manager 110 may keep track of the various Service Nodes (SN) 115 available in the distributed system 100 along with what service each Service Node is configured to provide. For example, the Service Manager 110 may maintain a register including each Service Node 115 with which the Service Manager 110 is able to communicate the service or services (such as encoded storage service or audio visualization service).

As the Service Nodes 115 are independent from each other, from the Application Manager 105, and from the Service Manager 110, each Service Node 115 is unaware of the task to which the execution of its particular service may be contributing. In other words, the Service Manager 110 may not typically maintain information regarding the requests made by the Application Nodes 120 and may not be aware of which component is using the requested Service Node 115. Thus, in order to facilitate the compilation of the various services that may be involved in completing a certain task requested by the Application Manager 105, the Application Node 120 is configured to generate a task identifier ("TID") for the particular task requested, as described below.

Figure 3:
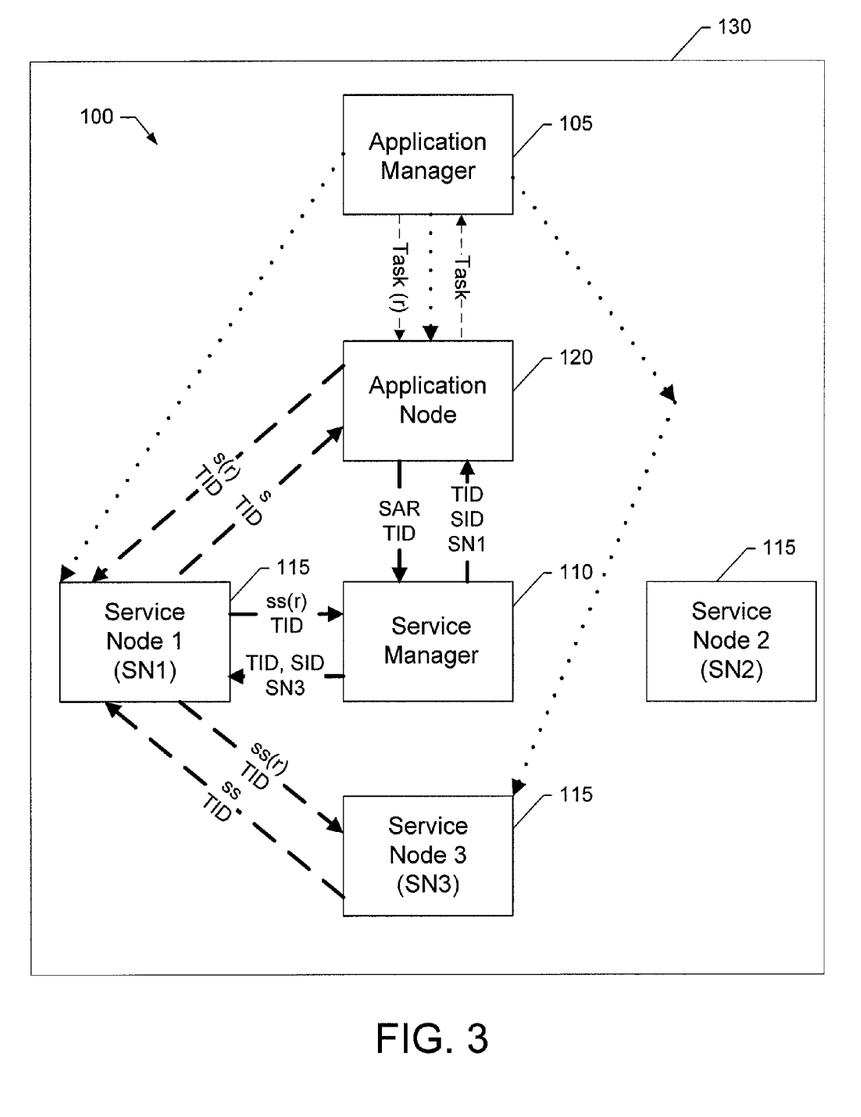
FIG. 3 is a schematic block diagram of a system and apparatus according to an exemplary embodiment of the present invention.

Although FIG. 3 depicts a distributed system 100 including one Application Manager 105, one Application Node 120, one Service Manager 110, and three Service Nodes 115, the system 100 may include any number of each of these components. These components (i.e., Application Manager, Application Node, etc.) may reside in subsystems that provide services for a system or device. Typically, an application or service that is visible to a user of the distributed system 100, including the functions performed by the components 105, 110, 115, 120, is implemented by software executed by a processor, although such applications and services may be implemented by software, hardware, or both. Furthermore, the components 105, 110, 115, 120 may reside on a single device 130, such as the mobile terminal 10 of FIGS. 1 and 2, having an operating platform that is based on independent service modules capable of using each others' services. In other embodiments, the components may reside on multiple devices that are capable of communicating, for example, over a network. For example, referring to FIG. 2, one or more of the components 105, 110, 115, 120 may reside on a mobile terminal 10, whereas other components 105, 110, 115, 120 may reside on a device 52. The mobile terminal 10 and the device 52 in this example may communicate to complete a task via the Internet 50 and/or GPRS 58, as illustrated.

Other embodiments may include a device with a single processor but one or more operating systems or execution environments, such as a Java virtual machine or an Internet browser with a Flash plug-in, and several services implemented for a particular execution environment. Such a system may involve distribution on the level of independently developed and mashed-up software components instead of or in addition to distribution at the processor or device level. In this case, independently developed applications that are dynamically composed may be managed into a more comprehensive service, irrespective of any management separately provided by each of the operating systems and execution environments. Although the system may be embodied in different manners, one embodiment includes a Flash application and a Java application provided as an application and a service over one operating system, and an ActiveX application provided as a service over another operating system. In this example, the Flash, Java and ActiveX applications would be in operable communication with each other. The device further includes processing elements that carry signals between the applications. The signals may include functions specific to the execution environment and system calls in accordance with the interface standard of the applicable operating system. In this regard, the system is capable of operating with one or more execution environments or interface standards.

In some embodiments, the task identifier may be a pseudorandom number that is large enough to make the chance of collisions (i.e., different tasks having the same task identifier) highly unlikely. Referring again to FIG. 3, the probability of collisions and the length of the task identifier will thus depend on various parameters of the system that the Application Node 120 is serving, such as the lifetime of the task identifier (discussed below), the granularity of the services requested from the Service Nodes, and the amount of service activity expected in the system, among other factors.

Once the Application Node 120 has generated a task identifier for a requested task, the Application Node 120 may then include the task identifier in any communication relating to that requested task. For example, in order to complete the requested task, the Application Node 120 may need to have various services executed. To do this, the Application Node 120 may communicate one or more Service Access Requests ("SAR") to the Service Manager 110 requesting information regarding which Service Node 115 is available to execute a particular service required for the task. The Service Access Request may thus include a description of the service required, among other criteria required to execute the service. The Application Node is typically configured to send one Service Access Request for each service from which it directly requires functionality in order to complete the task requested and is responsible for managing the combination of the functionality provided by those services. Thus, if the Application Node requires multiple services simultaneously, the Application Node would send multiple SARs and receive separate responses to them. Furthermore, the Service Access Request may include or otherwise be associated with the task identifier such that the service described by the Service Access Request is associated with the task originally requested by the Application Manager 105.

In receiving the Service Access Request including the task identifier, the Service Manager 110 may associate the task identifier with a service identifier ("SID") describing the service requested in the Service Access Request, as well as with the Service Node 115 that is capable of and available for executing that particular service. For example, a Service Node that provides encoded storage service may register in the Service Manager one service that finds and decodes MP3 files into an audio stream and another service that finds and decodes MP4 files into an audio and video stream. When the Service Manager receives a Service Access Request for either type of service in this example, it would generate and allocate a service identifier specific to that service, although both services are provided by the same Service Node. Each of the services can be further associated with one or more task identifiers in response to processes started by an application and requiring those services. The Service Manager 110 may, for example, refer to a stored register of information regarding the various Service Nodes and their configurations and may designate one of the Service Nodes that is able to meet the requirements of the Service Access Request for association with the task identifier. The task identifier, service identifier, and designated Service Node 115 may then be communicated to the Application Node 120 for further processing. Furthermore, the Service Manager 110 may store the association of the task identifier, service identifier, and designated Service Node 115 in a memory.

At this point, the Application Node 120 may be able to communicate a service request ("s(r)") (including or otherwise associated with the same task identifier) to the Service Node 115 designated by the Service Manager 110. In some cases, the service request may be included in the form of a Service Access Request and may be communicated over a service connection with the Service Node 115. For example, if the Service Manager 110 returned "SN1" as the Service Node available and capable of executing the service requested, the Application Node 120 may communicate the service request and associated task identifier to Service Node 1. Service Node 1 may in turn execute the service and return the completed service ("s"), along with the task identifier, to the Application Node 120 in satisfaction of the service request.

In some instances, however, the particular Service Node (e.g., Service Node 1) may need to turn to one or more other Service Nodes to execute the service. In this case, Service Node 1 may communicate a sub-service request ("ss(r)") (which may include the service request initially received from the Application Node 120, a portion of that service request, or the identifier of the service provided to the Application Node 120 or an intermediate Service Node) and the associated task identifier to the Service Manager 110, which may in turn consult its register or other source of information in order to identify a corresponding service identifier and designate a Service Node 115 that is available for and capable of executing the sub-service requested. The Service Manager 110 may again associate the task identifier with the service identifier and designated Service Node 115 and store this information in memory.

In FIG. 3, for example, the Service Manager 110 designates Service Node 3 to execute the sub-service request communicated by Service Node 1 and returns the task identifier, service identifier, and designated Service Node ("SN3") to Service Node 1. In this way, Service Node 1 may be able to communicate the sub-service request and task identifier to Service Node 3, which was designated by the Service Manager 110. Upon receiving the sub-service request, Service Node 3 may execute the sub-service and communicate the completed sub-service ("ss") and task identifier to Service Node 1. As discussed above, Service Node 1 may then communicate the completed service (which may require the assembly or arrangement of multiple completed sub-services from other Service Nodes 115) to the Application Node 120, along with the task identifier.

In some cases, the service request may be a sub-service request in which the information fields pertaining to the service request received from the Application Node 120 or an intermediate Service Node 115 are left blank.

In some embodiments, the Application Node 120 may assemble multiple completed services from multiple Service Nodes 115 based on a common task identifier to form a completed task. The completed task ("Task") may then be returned to the Application Manager 105 in satisfaction of the original task request ("Task (r)") received.

In some cases, the Application Node 120 may be configured to communicate the task identifier to the Application Manager 105 upon receiving the task request and generating the task identifier. The Application Manager 105 may be configured to establish a control connection with the Application Node(s) and the various Service Nodes 115 involved in completing a requested task based on the task identifier. In this case, the Application Node 120 and Service Node 115 need to identify themselves with unique identifiers when establishing a control connection, allowing the Application Manager 105 to associate each connection with a specific Application Node 120 or Service Node 115. The method of establishing the control connections may be implementation-specific; for example, all Application Node and Service Node implementations may be required to connect to a specific port when activated. The Application Manager 105 may also be configured to communicate Policy Action Requests via the control connection to the respective Application Node(s) and Service Nodes in order to modify the behavior of the components. A Policy Action Request may, for example, include instructions to gracefully deactivate a service so that volatile state information may be stored for a later resumption of the service in case the other services participating in a task fail to provide advance notification, or to change the operating point of a service in unison with the other services participating in a task in order to reduce power consumption or increase performance. Furthermore, once the Application Node 120 has completed a requested task, the Application Node 120 may request that the Application Manager 105 delete the task identifier from its memory. Similarly, the Application Node 120 may request that the Service Manager 110 remove from its memory the task identifier and associated service identifiers and Service Nodes for a completed task.

Task identifiers generated by the Application Nodes 120 may have certain characteristics to facilitate communication between system components and the overall functioning of the system 100. For example, each task identifier may be associated with a predetermined lifetime, such as 5 minutes for a task initiated by an end user (e.g., the music player application of the previous example), after the expiration of which the task identifier and any associated information would be removed from the memory of each component. In this way, the system 100 may be periodically purged of old and irrelevant data.

In a case in which the lifetime of a task identifier is about to expire, but the requested task has not yet been completed, the Application Node 120 may be configured to communicate a Service Update Request to the Service Manager 110, including the service identifier and task identifier, instructing the Service Manager 110 to maintain the task identifier past its lifetime (indefinitely or for a predetermined amount of time). As a result, any information associated with the same task identifier, including information from Service Nodes 115 requesting designations of other Service Nodes 115 to execute sub-service requests, would be maintained based on the single Service Update Request from the Application Node 120.

Furthermore, each Service Node 115 may be configured to delete from its memory any task identifier that it no longer serves, such as a task identifier corresponding to a service request that the Service Node 115 has already completed or that has been canceled. The Service Nodes 115 may also be configured to mark as inactive any task identifier and associated information corresponding to services that do not require processing at the moment or are otherwise idle. In this way, each Service Node 115 may be able to ignore any resources related to the specific task identifier, for example, or Policy Action Requests from the Application Manager 105 to modify the Service Node's behavior related to the particular task identifier. The Service Node 115 may also communicate a Service Update Request to the Service Manager 110 including the service identifier and the task identifier, where the task identifier is given a lifetime of zero such that the Service Manager 110 is permitted to remove the association of that service identifier with the task identifier.

The Application Node 120 may be able to include in its communications with the Service Manager 110 an indication that the Application Node 120 is an Application Node (as opposed to a Service Node or other component). This may avoid the Service Manager 110 storing the same task identifier with associated information communicated by the generating Application Node more than once. However, in communications with Service Nodes 115 or other components, the Service Manager 110 would be permitted to store the same task identifier with respect to the information communicated from the Service Nodes as this information would not be duplicative of the information included in the original Service Access Request from the generating Application Node 120.

Each task identifier generated by the Application Node 120 may include an authorization portion, such as a signature or other method of authorization, to indicate that the communication is genuine and authorized rather than malicious. For example, the task identifier may include credentials of the transmitting component that are evaluated by the Service Manager 115 upon receipt, or a random key value that marks the task identifier as genuine. Furthermore, to ensure that a single intermediate malicious Service Node 115 does not misuse the task identifier, the Application Node 120 may share a seed signature or value with the Service Manager 110 to allow the Service Manager 110 to verify that each subsequent task identifier is correct. In this way, only the generating Application Node 120 would be authorized to send Service Update Requests, and any task identifier signature or value may be verified as derived from the seed signature or value, eliminating communications from Service Nodes 115 for which the task identifier cannot be verified.

In some embodiments, the Service Manager 110 may be configured to maintain the association of the task identifiers with the respective service identifiers. This may avoid the necessity of separate reporting by the Application Node 120 and Service Nodes 115 to the Application Manager 105. In this case, each Service Node 115 may include in its communication to the Service Manager 110 a list of task identifiers that are served by that Service Node 115 in the resulting service connection. The Service Manager 110 may then also maintain the list of task identifiers for each service identifier and may be capable of tracing the chain of service identifiers (i.e., which Service Nodes were responsible for executing which service requests and sub-service requests).

In this case, the Service Manager 110 may be a more complicated entity that is involved not only in service registration and discovery procedures, but also in maintaining the state of the overall system activity in the form of tasks, which is otherwise a function reserved for the Application Manager 105. In order to identify the directions and branching of the service associations in a chain of a Service Nodes 1, 2 and 3 that complete a particular task, Service Node 2, for example, would need to include in its Service Access Request to the Service Manager 110 the service identifier that Service Node 1 used when accessing the service provided by Service Node 2. The Service Manager 110 can then associate the service identifier of the service provided by Service Node 2 to Service Node 1 with the service identifier of the service provided by Service Node 3 to Service Node 2.

In order to remove obsolete associations in the absence of an Application Manager 105 providing that functionality, when a service is no longer needed by a Service Node 115 in completing a task, that Service Node 115 may send a Service Completed Request to the Service Manager 110 containing the service identifier and the task identifier of the task that no longer requires the indicated service. The Service Manager 110 would then remove the association of the task identifier with the service identifier as well as subsequent service identifiers of Service Nodes 115 that were later in the chain of services that were needed for the task.

In order to establish new associations in the absence of an Application Manager 105 providing that functionality, when a new task is served by a Service Node 115 through the use of an already accessed service, that Service Node 115 may send a Service Update Request to the Service Manager 110 containing the task identifier of the new task and the service identifier of the existing service that from then on is used for that task. The Service Manager would then associate the new task identifier with the service identifier as well as subsequent service identifiers in Service Nodes 115 that were later in the chain of services that were needed for the task.

In systems where there are only chains of services (i.e., where any single Service Node 115 does not directly access two or more other Service Nodes 115 to complete a task), the Service Manager 110 may allocate a service identifier N to the service provided by Service Node 2 to Service Node 1 an incrementally higher service identifier N+1 to the service provided by Service Node 3 to Service Node 2, and so on. This may be done without the need for any Service Node 115 to provide the service identifiers of the previous Service Node 115 in the chain, because each new Service Access Request using a single task identifier would indicate to the Service Manager 110 the next Service Node 115 in the chain.

In relatively static systems where the tasks and their constituent services are known to the system, such as when they are specific to a limited set of use cases that a device is designed to perform, the associations between the Application Node 120 and the Service Nodes 115 participating in a task may be configured in the Application Manager 105. In this case, the Service Node 115 would not need to use task identifiers.

In order to communicate with other components and execute the required tasks, services, and sub-services, each component 105, 110, 115, 120 may include a processor configured to perform the functions described above. Each component 105, 110, 115, 120 may also include a memory for storing information, such as task identifiers, service identifiers, and other associated information.

Figure 4:
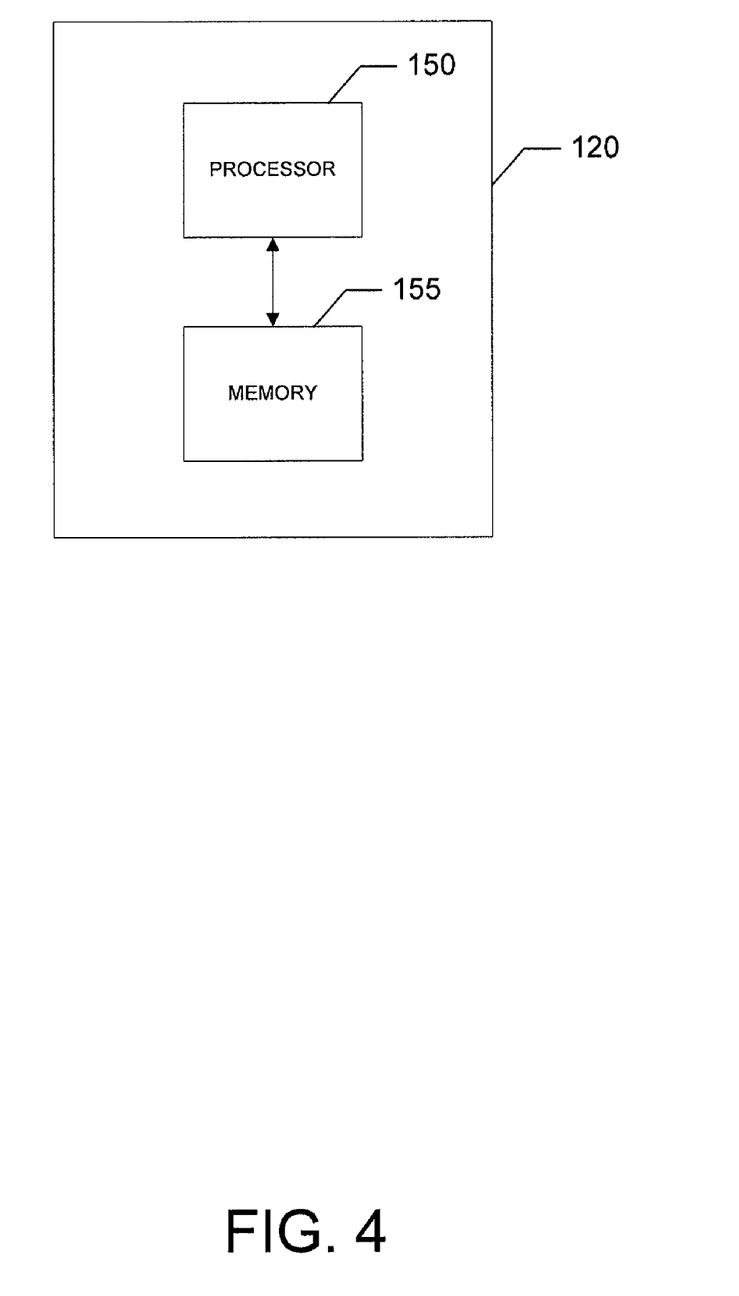
FIG. 4 is a schematic representation of an Application Node according to an exemplary embodiment of the present invention.

Referring to FIG. 4, for example, the Application Node 120 may include one or more means, all of which may be embodied by a processor 150 configured for receiving a task request from the Application Manager 105, generating a task identifier that is associated with the requested task, and communicating a Service Access Request including the task identifier to the Service Manager 110 and receiving a designation of the Service Node 115 configured to execute the service required by the Service Access Request. The means, such as the processor 150, may be further configured to communicate the service via a service request including the task identifier to the designated Service Node 115 and receive the completed service from the Service Node 115, as well as to assemble the completed service with other completed services that include the same task identifier into a completed task to be communicated to the Application Manager 105, as described above. In some cases, the means, such as the processor 150, may also be configured to communicate to the service manager a Service Update Request including the task identifier and a designation of any service node that has not completed a respective service before an expiration of the predetermined lifetime, where the Service Update Request instructs the service manager to maintain the task identifier.

In some embodiments, the Application Node 120 may also include a memory 155 configured to store certain information, such as task requests received from the Application Manager 105, generated task identifiers, lifetimes for task identifiers, and signatures or keys for authentication, among other information, as well as the computer program instructions executed by the processor to perform the various functions. The Application Manager 105, Service Manager 110, and Service Nodes 115 may have structures that are comparable to that depicted in FIG. 4 for performing their respective functions.

Referring again to FIG. 3, in some cases a distributed system 100 may include one or more components that are not configured according to the embodiments described above, but that may still cooperate with other components that are so configured. For example, if the Application Node does not support the use of a task identifier, it would not include a task identifier in its Service Access Request or communicate the task identifier to the designated Service Nodes. Such an Application Node may likewise not be capable of supporting a control connection with the Application Manager. In this case, the Service Manager 110 may be configured to identify the non-supporting Application Node, generate a task identifier for the Application Node's Service Access Request, and associate that task identifier with the service identifier and designated Service Node 115.

Subsequently, when a Service Node 115 that supports the use of task identifiers does not receive a task identifier from a non-supporting Application Node or a non-supporting Service Node, the supporting Service Node 115 may request the task identifier from the Service Manager 110, which can resolve the task identifier based on the service identifier associated with the service connection between the non-supporting component and the supporting Service Node 115. Once the supporting Service Node 115 receives the task identifier from the Service Manager 110, the supporting Service Node 115 may then use the task identifier in subsequent communications. The supporting Service Node 115 may also be able to identify when the non-supporting Application Node has completed the task requested and indicate the completed task to the Service Manager 110, which otherwise would not receive the indication from the non-supporting Application Node.

If a Service Node does not support the use of a task identifier, it would not include the task identifier in its sub-service requests and would likely not be capable of supporting a control connection with the Application Manager 105. In this case, the Service Manager 110 may identify the non-supporting Service Node, resolve the appropriate task identifier (e.g., based on the association made in the register when the Service Node was designated to the Application Node 120), and associate the task identifier with the service identifier and the Service Node designated to execute the sub-service request. Furthermore, non-supporting Service Nodes may be marked in the register of the Service Manager 110 as providing services to an "unknown" task identifier for the purpose of differentiating such non-supporting Service Nodes from other Service Nodes that may be available for designation.

Alternatively, the Service Manager 110 may manage tasks involving several non-supporting Service Nodes by monitoring sub-service requests communicated from a Service Node that was previously designated in response to a Service Access Request from an Application Node 120 and that are received somewhat sequentially from that Service Node. In this way, the Service Manager 110 may be able to associate consecutive sub-service requests from the same non-supporting Service Node to the task identifier associated with that Service Node in the register (following the initial communication with the Application Node 120).

Figure 5:
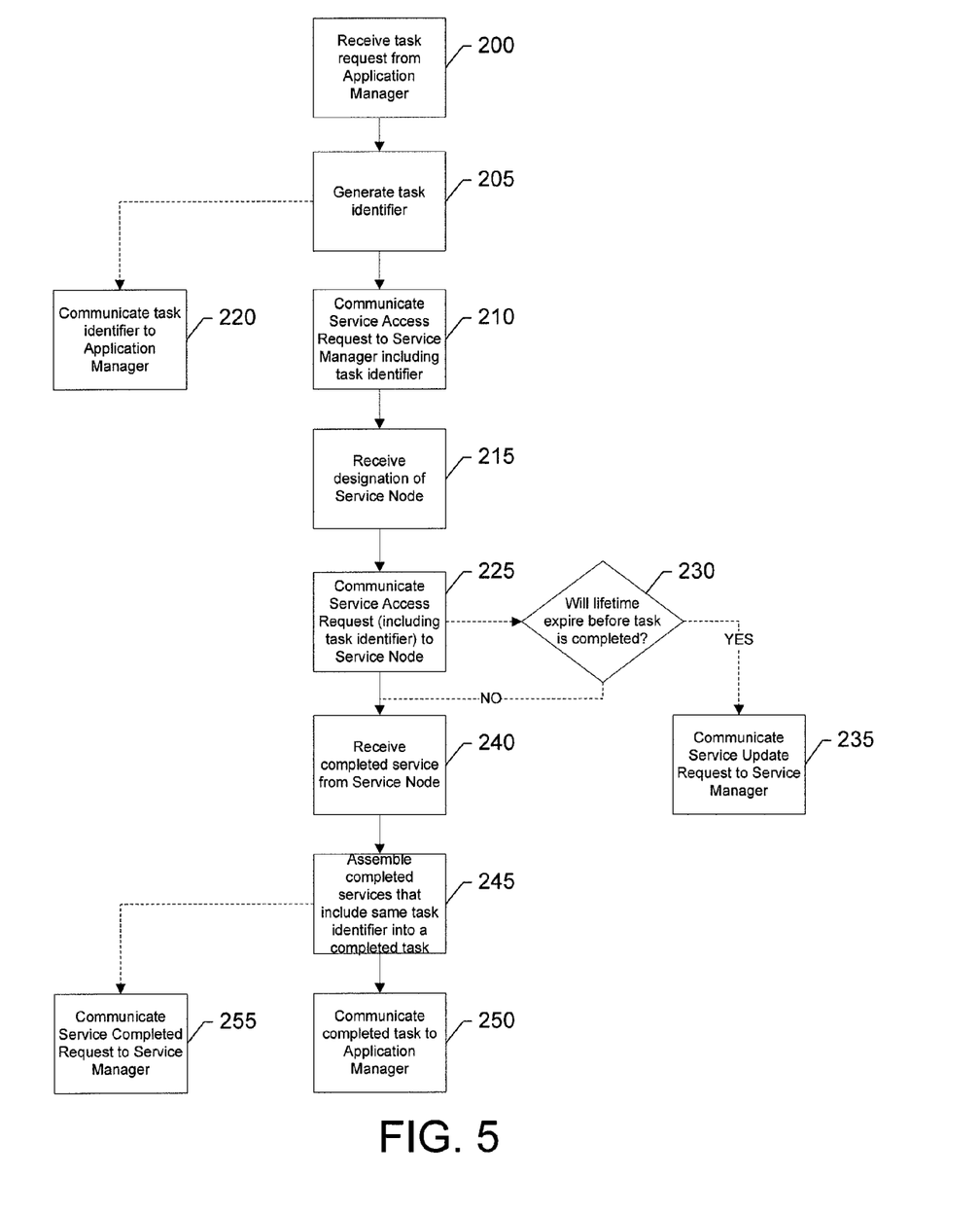
FIG. 5 illustrates a flowchart according to an exemplary embodiment for managing tasks in a distributed system.

In other embodiments, a method for managing tasks in a distributed system is provided. Referring to FIG. 5, a task request is initially received from an Application Manager, and a task identifier that is associated with the requested task is generated. See FIG. 5, blocks 200, 205. As previously discussed, the task identifier may be pseudorandom and may be sized such that conflict with other task identifiers may be minimized, according to the configuration of the particular distributed system. Furthermore, the task identifier may have a predetermined lifetime, such that after the lifetime has expired, the Service Manager and/or other components to which the task identifier has been communicated and stored may be configured to delete the task identifier. Also, the task identifier may include an authorization portion, such as a signature or other method of authentication, that allows the Service Manager to verify that a communication including the task identifier is genuine and authorized rather than malicious.

Once the task identifier is generated, a Service Access Request that includes the task identifier may be communicated to the Service Manager. Block 210. A designation of a Service Node configured to execute the service described by the Service Access Request may then be received. Block 215. A service identifier as well as the designation of the Service Node may be associated with the task identifier, as previously described. In some cases, the task identifier may also be communicated to the Application Manager in order to facilitate a control connection between the Application Manager and the respective Application Node(s) and Service Nodes involved in completing the particular task. Block 220. Although communication of the task identifier to the Application Manager is shown in FIG. 5 as occurring in parallel with communication of the Service Access Request to the Service Manager, the task identifier may be communicated to the Application Manager before, after, or at the same time as the Service Access Request is communicated.

A service request, which may be in the form of a Service Access Request, including the task identifier may then be communicated to the designated Service Node. Block 225. If the task identifier has a predetermined lifetime and the lifetime is expected to expire before the requested task is completed, a Service Update Request may be communicated to the Service manager. Block 230, 235. The Service Update Request may include the task identifier and a designation of any service node that has not completed a respective service before the expiration of the predetermined lifetime. In this way, the Service Update Request may instruct the Service Manager to maintain the task identifier indefinitely or for a specified amount of time, rather than delete it.

Eventually, completed services may be received from the various designated Service Nodes involved in completing the requested task. Block 240. Executed services that include the same task identifier are thus assembled into a completed task, and the completed task is then communicated to the Application Manager. Blocks 245, 250. Upon completion of the requested task as described above, a Service Completed Request may be communicated to the Service Manager. Block 255. The Service Manager may be configured to delete the task identifier, for example before expiration of its lifetime (if the task identifier has a lifetime) upon receiving Service Completed Request. Although the Service Completed Request is shown in FIG. 5 as being communicated to the Service Manager in parallel with communication of the completed task to the Application Manager, the Service Completed Request may be communicated before, after, or at the same time as the completed task is communicated.

Exemplary embodiments of the present invention have been described above with reference to block diagrams and flowchart illustrations of methods, apparatuses, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as a processor including, for example, the controller 20 (shown in FIG. 1) and/or the processor 150 (shown in FIG. 4), to function in a particular manner, such that the instructions stored in the computer-readable memory produce an article of manufacture including computer-readable instructions for implementing the function specified in the flowchart block or blocks illustrated in FIG. 5. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory including computer program code, the memory and the computer program code configured to, with the processor:
   receive a task request by an application node and generate a task identifier that is associated with the requested task;
   communicate a service access request including the task identifier to a service manager by the application node, wherein the Service Access Request describes a service required to complete the requested task, and receive a designation of a service node configured to execute the service of the service access request;
   communicate the service including the task identifier by the application node to the designated service node and receive a completed service from the service node;
   assemble the completed service with other completed services that include the same task identifier into a completed task by the application node; and
   communicate a service completed request to the service manager by the service node and, in parallel, communicate a completed task to an application manager by the application node, wherein the service manager and the application manager are configured such that no direct communication occurs between the service manager and the application manager.

2. The apparatus of claim 1, wherein the processor is configured to generate a task identifier that is pseudorandom and has a predetermined lifetime, wherein after an expiration of the predetermined lifetime the service manager is configured to delete the task identifier.

3. The apparatus of claim 2, wherein the processor is configured to communicate to the service manager a service update request including the task identifier and a designation of any service node that has not completed a respective service before an expiration of the predetermined lifetime, wherein the service update request instructs the service manager to maintain the task identifier.

4. The apparatus of claim 1, wherein the processor is configured to generate a task identifier that includes an authorization portion that allows the service manager to verify that a communication including the task identifier is genuine.

5. The apparatus of claim 1, wherein the processor is configured to communicate the service completed request to the service manager including the task identifier when the requested task is complete, wherein the service manager is configured to delete the task identifier upon receiving the service completed request.

6. The apparatus of claim 1, wherein the processor is configured to communicate the task identifier to the application manager.

7. A method comprising:
   receiving a task request by an application node and generating a task identifier that is associated with the requested task;
   communicating a service access request including the task identifier to a service manager by the application node, wherein the service access request describes a service required to complete the requested task, and receiving a designation of a service node configured to execute the service of the service access request;
   communicating the service including the task identifier by the application node to the designated service node and receiving a completed service from the service node;
   assembling the completed service with other completed services that include the same task identifier into a completed task by the application node; and communicating a service completed request to the service manager by the service node and, in parallel, communicating a completed task to an application manager by the application node, wherein the service manager and the application manager are configured such that no direct communication occurs between the service manager and the application manager.

8. The method of claim 7, wherein generating the task identifier comprises generating a pseudorandom task identifier having a predetermined lifetime, wherein after an expiration of the predetermined lifetime the service manager is configured to delete the task identifier.

9. The method of claim 8 further comprising communicating to the service manager a service update request including the task identifier and a designation of any service node that has not completed a respective service before an expiration of the predetermined lifetime, wherein the service update request instructs the service manager to maintain the task identifier.

10. The method of claim 7, wherein generating the task identifier comprises generating a task identifier that includes an authorization portion that allows the service manager to verify that a communication including the task identifier is genuine.

11. The method of claim 7, wherein the service completed request is communicated to the service manager including the task identifier when the requested task is complete, wherein the service manager is configured to delete the task identifier upon receiving the service completed request.

12. The method of claim 7 further comprising communicating the task identifier to the application manager.

13. A computer program product comprising at least one non-transitory computer-readable storage medium having computer-readable program code portions stored therein, the computer-readable program code portions comprising:
a first executable portion for receiving a task request;
a second executable portion for generating a task identifier that is associated with the requested task;
a third executable portion for communicating a service access request including the task identifier to a service manager by the application node, wherein the service access request describes a service required to complete the requested task, and receiving a designation of a service node configured to execute the service of the service access request;
a fourth executable portion for communicating the service including the task identifier by the application node to the designated service node and receiving a completed service from the service node;
a fifth executable portion for assembling the completed service with other completed services that include the same task identifier into a completed task by the application node; and
a sixth executable portion for communicating a service completed request to the service manager by the service node and, in parallel, communicating a completed task to an application manager by the application node, wherein the service manager and the application manager are configured such that no direct communication occurs between the service manager and the application manager.

14. The computer program product of claim 13, wherein the second executable portion is further configured for generating a pseudorandom task identifier having a predetermined lifetime, wherein after an expiration of the predetermined lifetime the service manager is configured to delete the task identifier.

15. The computer program product of claim 14 further comprising a seventh executable portion for communicating to the service manager a service update request including the task identifier and a designation of any service node that has not completed a respective service before an expiration of the predetermined lifetime, wherein the service update request instructs the service manager to maintain the task identifier.

16. The computer program product of claim 13, wherein the second executable portion is further configured for generating a task identifier that includes an authorization portion that allows the service manager to verify that a communication including the task identifier is genuine.

17. The computer program product of claim 13, wherein the-sixth executable portion is configured for communicating the service completed request to the service manager including the task identifier when the requested task is complete, wherein the service manager is configured to delete the task identifier upon receiving the service completed request.

18. The computer program product of claim 13 further comprising a seventh executable portion for communicating the task identifier to the application manager.

19. An apparatus comprising:
means for receiving a task request by an application node and for generating a task identifier that is associated with the requested task;
means for communicating a service access request including the task identifier to a service manager by the application node, wherein the service access request describes a service required to complete the requested task, and for receiving a designation of a service node configured to execute the service of the service access request;
means for communicating the service including the task identifier by the application node to the designated service node and for receiving a completed service from the service node;
means for assembling the completed service with other completed services that include the same task identifier into a completed task by the application node; and
means for communicating a service completed request to the service manager by the service node and, in parallel, communicating a completed task to an application manager by the application node, wherein the service manager and the application manager are configured such that no direct communication occurs between the service manager and the application manager.

20. The apparatus of claim 19 further comprising means for communicating to the service manager a service update request including the task identifier and a designation of any service node that has not completed a respective service before an expiration of the predetermined lifetime, wherein the service update request instructs the service manager to maintain the task identifier.

21. A system comprising:
a plurality of service nodes each configured to execute a service component;
a service manager configured to communicate with the service nodes and to maintain a register of the service nodes including a service identifier associated with a respective service node and identifying the service for which the respective service node is configured to execute;
an application node configured to communicate with the service manager and the service nodes; and
an application manager configured to establish a control connection with the application node and at least one of the service nodes;

wherein the application manager is configured to communicate a task request to the application node;

wherein the application node is configured to generate a task identifier that is associated with the requested task and to communicate a service access request including the task identifier to the service manager, wherein the service access request describes a service required to complete the requested task;

wherein the service manager is configured to associate the task identifier with a service identifier based on the service described by the service access request and with a designated service node configured to execute the service, and wherein the service manager is configured to communicate the task identifier, service identifier, and the designated service node to the application node;

wherein the application node is configured to communicate the service including the task identifier to the designated service node and to receive a completed service including the task identifier from the designated service node;

wherein the application node is further configured to assemble the completed service with other completed services that include the same task identifier into a completed task and to communicate the completed task to the application manager;

wherein the application manager and the service manager are configured to communicate with the application node without direct communication between the application manager and the service manager; and wherein the service node is configured to communicate a service completed request to the service manager in parallel with the application node communicating the completed task to the application manager.

22. The system of claim 21, wherein at least one service node is configured to communicate a sub-service including the task identifier to another service node, wherein the other service node is configured to execute the sub-service, and wherein the sub-service is required to complete the service communicated by the application node.

23. The system of claim 21, wherein the application node is configured to generate a task identifier that is pseudorandom and has a predetermined lifetime, wherein after an expiration of the predetermined lifetime the service manager is configured to delete the task identifier.

24. The system of claim 21, wherein the application node is configured to communicate to the service manager a service update request including the task identifier and a designation of any service node that has not completed a respective service before an expiration of the predetermined lifetime, wherein the service update request instructs the service manager to maintain the task identifier.

25. The system of claim 21, wherein the application node is configured to communicate the task identifier to the application manager, and wherein the application manager is configured to control the behavior of the application node and any service node involved in the requested task by sending via the control connection a policy action request to the respective application node and service nodes.

26. The system of claim 21, wherein the service node is configured to delete a task identifier that is no longer served by the service node and to mark as inactive a task identifier that does not require processing.

27. The system of claim 21, wherein the application node is configured to generate a task identifier that includes an authorization portion that allows the service manager to verify that a communication including the task identifier is genuine.

28. The system of claim 21, wherein the application node is configured to communicate the service completed request to the service manager including the task identifier when the requested task is complete, wherein the service manager is configured to delete the task identifier upon receiving the service completed request.

29. The system of claim 21, wherein the application node is configured to communicate the task identifier to the application manager.

30. The system of claim 21, wherein the service manager is configured to trace a chain of service identifiers.

* * * * *